United States Patent
Chan et al.

(10) Patent No.: US 9,363,661 B2
(45) Date of Patent: Jun. 7, 2016

(54) METHOD OF PAIRING MOBILE DEVICES (75) Inventors: Tong Yap Chan, Selangor (MY); Chi Long Yeong, Selangor (MY)

(73) Assignee: SILVERLAKE MOBILITY ECOSYSTEM SDN BHD, Selangor (MY)

( * ) Notice: Subject to any disclaimer, the term of this patent is extended or adjusted under 35 U.S.C. 154(b) by 0 days.

(21) Appl. No.: 14/423,505

(22) PCT Filed: Aug. 29, 2012

(86) PCT No.: PCT/MY2012/000245
§ 371 (c)(1),
(2), (4) Date: Feb. 24, 2015

(87) PCT Pub. No.: WO2014/035231
PCT Pub. Date: Mar. 6, 2014

(65) Prior Publication Data
US 2015/0215770 A1 Jul. 30, 2015

(51) Int. Cl.
*H04W 12/04* (2009.01)
*H04W 8/14* (2009.01)
*H04L 29/06* (2006.01)
*H04W 72/04* (2009.01)
*H04W 4/20* (2009.01)
*H04W 4/02* (2009.01)

(52) U.S. Cl.
CPC ............... *H04W 8/14* (2013.01); *H04L 63/18* (2013.01); *H04W 4/026* (2013.01); *H04W 4/206* (2013.01); *H04W 12/04* (2013.01); *H04W 72/048* (2013.01); *H04W 4/027* (2013.01)

(58) Field of Classification Search
CPC ....... H04W 8/14; H04W 4/026; H04W 12/04; H04W 72/048
USPC ...................................... 455/456.1
See application file for complete search history.

(56) References Cited

U.S. PATENT DOCUMENTS

| | | | | |
|---|---|---|---|---|
| 7,907,901 | B1* | 3/2011 | Kahn et al. | 455/41.2 |
| 2010/0167646 | A1* | 7/2010 | Alameh et al. | 455/41.2 |
| 2010/0278345 | A1* | 11/2010 | Alsina | H04L 63/0492 380/283 |
| 2011/0189981 | A1* | 8/2011 | Faith et al. | 455/414.1 |
| 2012/0198531 | A1 | 8/2012 | Ort et al. | 726/7 |
| 2012/0215700 | A1 | 8/2012 | Falk et al. | 705/67 |
| 2013/0110974 | A1* | 5/2013 | Arrasvuori et al. | 709/217 |
| 2014/0206288 | A1* | 7/2014 | Liu et al. | 455/41.2 |

OTHER PUBLICATIONS

International Search Report from corresponding International Patent Application No. PCT/MY2012/000245, dated Mar. 12, 2013.

(Continued)

*Primary Examiner* — Michael Neff
(74) *Attorney, Agent, or Firm* — Pearne & Gordon LLP (57) ABSTRACT

A method of pairing mobile devices 102,104 is disclosed herein. In a described embodiment, the method includes (i) receiving pairing parameters from the mobile devices 102, 104 to be paired, the pairing being initiated by shaking movement of the mobile devices 102,104 and the pairing parameters including respective shaking directions of the mobile devices 102,104; (ii) verifying the pairing parameters with pairing conditions to determine the two mobile devices 102, 104 for pairing; (iii) determining if the shaking directions are to be used in the verification step (ii); and (iv) if the pairing conditions are satisfied, pairing the mobile devices 102,104. An apparatus for pairing mobile devices and other pairing methods are also disclosed.

16 Claims, 6 Drawing Sheets

(56) References Cited

OTHER PUBLICATIONS

Written Opinion of the International Searching Authority from corresponding International Patent Application No. PCT/MY2012/000245, dated Mar. 12, 2013.

International Preliminary Report on Patentability from corresponding International Patent Application No. PCT/MY2012/000245, dated Aug. 12, 2014.

* cited by examiner

METHOD OF PAIRING MOBILE DEVICES

BACKGROUND AND FIELD OF THE INVENTION

This invention relates to a method of pairing mobile devices, particularly but not exclusively, for transferring data between paired mobile devices.

With omnipresence of mobile phones and advancement of mobile technologies, there is an increasing demand for mobile devices to exchange information. For example, two mobile phones may exchange data via Bluetooth™ connection but pairing problems like "Pairing Unsuccessful" are common. There have been proposed pairing algorithms which are simpler and have a higher success rate but such pairing algorithms may not be accurate.

It is an object of the present invention to provide a method of pairing mobile devices which addresses at least one of the disadvantages of the prior art and/or to provide the public with a useful choice.

SUMMARY OF THE INVENTION

In accordance with a first aspect of the present invention, there is provided a method of pairing mobile devices for transferring data between paired mobile devices, the method comprising, (i) verifying pairing parameters with pairing conditions to determine the mobile devices for pairing, at least one of the pairing parameters being received from the mobile devices to be paired, the pairing being initiated by shaking movements of the mobile devices and the at least one pairing parameter including respective orientations of the mobile devices; and (ii) if the pairing conditions are satisfied, pairing the mobile devices.

The term "mobile device" is understood to mean any device which is mobile or portable such as a device which is normally carried around by a user. Examples of mobile devices include mobile phones, tablets, portable personal computers, PDA's and other electronic devices.

The term "pairing" may mean pairing between two mobile devices or pairing between one mobile device and other plurality of mobile devices.

An advantage of the described embodiment is that with the use of shaking directions of the mobile devices, this achieves a more accurate and faster pairing of the mobile devices. Further, this also enhances success rate of the pairing.

At least one of the parameter may be provided by a pairing server for pairing the mobile devices. The method may further comprise determining if the orientations of the mobile phones are to be used in the verification step (i); and if so, verifying the orientations of the mobile devices.

Preferably, the method further comprises continuously recording the orientation of the mobile devices. This is useful since the orientations of the mobile phones during the shaking movement may not be an accurate determination of the orientations of the mobile phones and thus, continuously recording the orientation of the mobile devices enables the method to determine the orientations of the mobile phones at selected times before the detection of the shaking movement. As a result, the method may include obtaining the orientation of the mobile devices at a predetermined time before initiation of the shaking movements. The predetermined time may vary depending on application and a preferred time is 1 second.

Verifying the pairing parameters may include inversing the orientation of one of the mobile devices to obtain an inversed orientation, and comparing the inversed orientation with the orientation of the other one or more mobile devices. The method may also include deriving maximum and minimum values of the inversed orientation based on an error margin, and comparing the maximum and minimum value with the orientation of the one or more mobile devices.

Preferably, the pairing parameters include geographical locations of the mobile phones and/or pairing initiation times at which requests for pairing are received. The pairing conditions may include a distance threshold, and step (i) includes determining distance between the two mobile phones based on the geographical locations of the mobiles phones; and comparing the distance with the distance threshold. The pairing conditions may include a time threshold, and step (i) includes determining difference between the initiation times of the two mobile phones; and comparing the difference with the time threshold.

Preferably, step (ii) includes generating a connection identifier for identifying the mobile devices for pairing; and transmitting the connection identifier to the two mobile devices; wherein the connection identifier is transmitted together with the data to be transferred.

The pairing in step (ii) may include pairing a said mobile device with another mobile device, or pairing a said mobile device with a plurality of other mobile devices.

According to a second aspect of the invention, there is provided apparatus for pairing mobile devices for transferring data between paired mobile devices, the apparatus comprising a controller for verifying pairing parameters with pairing conditions to determine the mobile devices for pairing, at least one of the pairing parameters being received from the mobile devices to be paired, the pairing being initiated by shaking movement of the mobile devices and the pairing parameters including respective orientations of the mobile devices, wherein the controller is further configures for pairing the mobile devices based on the verified pairing parameters.

According to a third aspect of the invention, there is provided a method of pairing mobile devices for transferring data between paired mobile devices, the method comprising (i) shaking a mobile device to initiate a pairing request (ii) in response to the shaking, transmitting at least one pairing parameter to a pairing server for verification against pairing conditions, the at least one pairing parameter including orientation of the mobile device; and (iii) receiving a connection identifier from the pairing server, the connection identifier being used in the data transfer.

According to a fourth aspect of the invention, there is provided a method of pairing mobile devices for transferring data between paired mobile devices, the method comprising (i) shaking the mobile devices to initiate pairing requests, (ii) verifying pairing parameters with pairing conditions by a pairing server to determine the mobile devices for pairing, at least one of the pairing parameters being received from the mobile devices to be paired, the at least one pairing parameter including respective orientations of the mobile devices; (iii) if the pairing conditions are satisfied, generating a connection identifier for identifying the mobile devices for pairing; and (vii) transmitting the connection identifiers to the mobile phones.

According to a fifth aspect of the invention, there is provided a method of pairing communication devices for transferring data, the method comprising receiving a first pairing request from a first communication device, the pairing request including information identifying a data transfer associated with a user; generating a unique code for identifying the data transfer; transmitting the unique code to the first communication device; receiving a pairing verification request from a second communication device, verifying if the second pairing request includes the unique code; and if so, processing the data transfer.

The unique code may be encoded as part of a QR code. If the data transfer is a payment transaction, the first communication device may be associated with a recipient of the payment. The second communication device may be associated with a payer of the payment.

Preferably, the method may comprise the second communication device, extracting the unique code from the QR code, wherein the pairing verification request includes the extracted unique code.

It should be appreciated that features relating to one aspect may also be applicable to the other aspects.

BRIEF DESCRIPTION OF THE DRAWINGS

Examples of the invention will now be described with reference to the accompanying drawings, in which.

DETAILED DESCRIPTION OF PREFERRED EMBODIMENT

Figure 1:
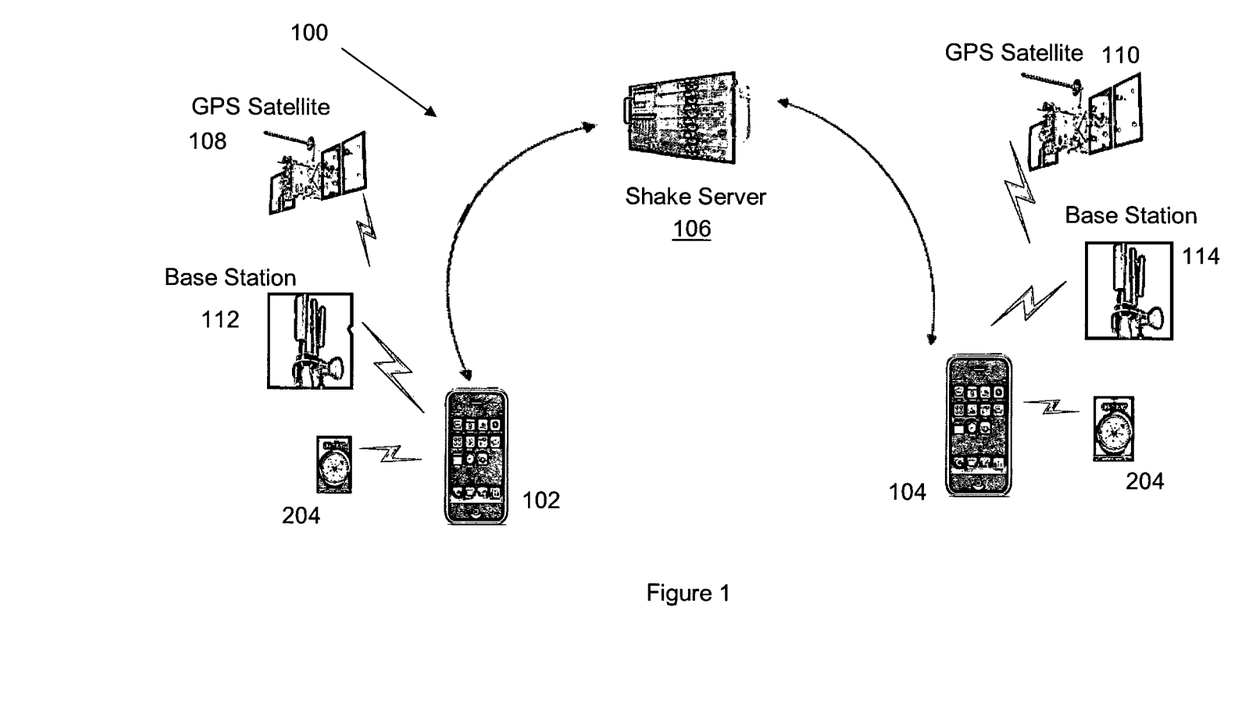
FIG. 1 is a schematic diagram of an apparatus for pairing two mobile phones according to a first embodiment.

FIG. 1 is a schematic diagram of an apparatus 100 for pairing two mobile phones according to a first embodiment. The apparatus 100 includes a first mobile device 102 wishing to transfer data to a second mobile device 104 and the first mobile device 102 needs to be paired with the second mobile device 104 to enable the data transfer. The apparatus 100 further includes a shake server 106, GPS satellites 108,110 and base stations 112,114.

Figure 2:
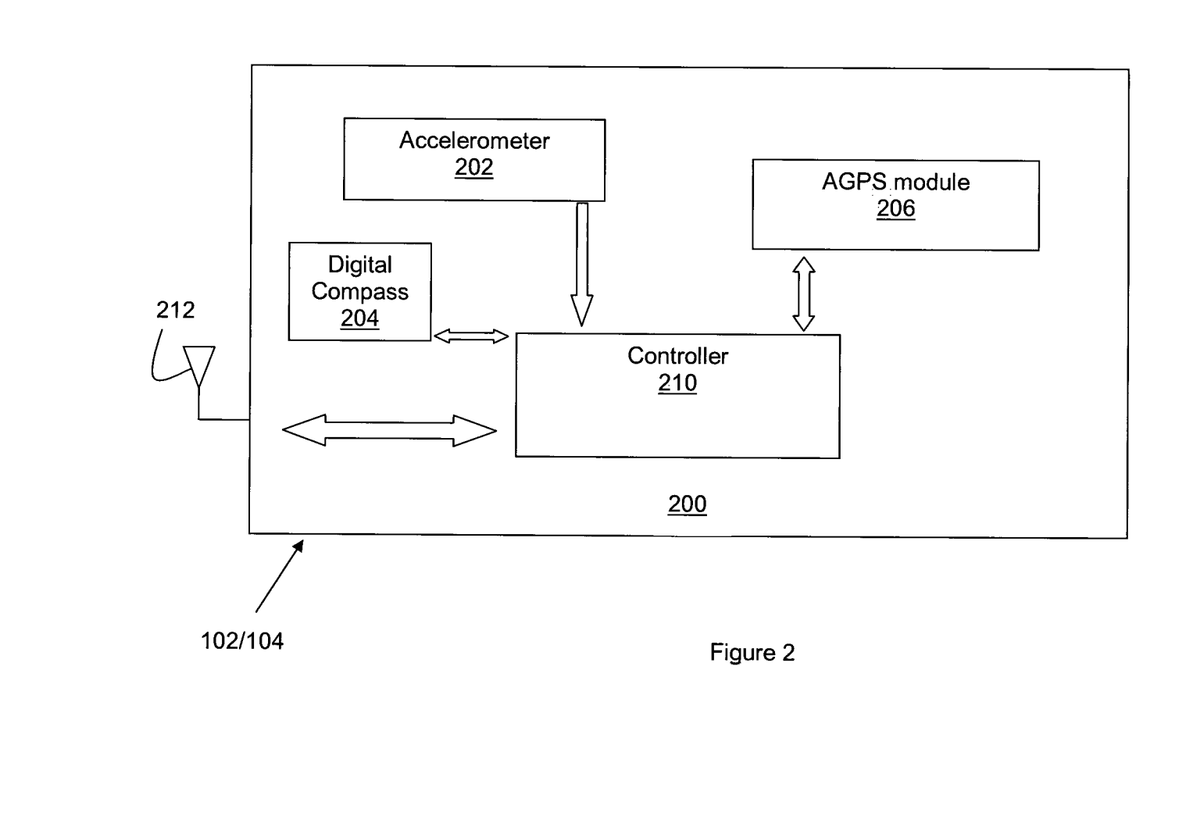
FIG. 2 is a block diagram of a pairing circuitry of the mobile phones of FIG. 1.

Each of the mobile phones 102,104 includes a pairing circuitry 200 and a block diagram of the pairing circuitry is shown in FIG. 2. The pairing circuitry 200 includes an accelerometer 202 for detecting shaking movement or motion of the mobile phone 102,104 and a digital compass 204 for detecting orientation of the mobile phone. The pairing circuitry 200 further includes an assisted global positioning system (AGPS) API or module 206 for receiving GPS signals from the respective GPS satellites 108,110 via the base stations 112,114 for determining geographical locations of the mobile phones 102,104.

The pairing circuitry 200 includes a processor or controller 210 for communicating with the digital compass 204, accelerometer 202, and the GPS module 206 and for controlling transmission and reception of information with an antenna 212 of the mobile phone 102,104. It should be appreciated that the controller 210 may be the same controller as the one for processing voice/data for the mobile phones 102,104.

The mobile phone 102,104 is arranged to communicate with the shake server 106 via the antenna 212 and respective base stations 112,114 and also for receiving the GPS signals. It would be appreciated that the communication between the mobile phone and shake server 106 may be via any wireless telecommunication transmission technologies for example, Wi-Fi, internet, 2G, 3G or 4G telecommunication standards. It is preferred for the shake server 106 to reside in the internet and the mobile phones 102,104 are then arranged to access the internet using such wireless technologies and the shake server 106 thus includes an internet port for communicating (receiving/transmitting) with the mobile phones 102,104.

Figure 3:
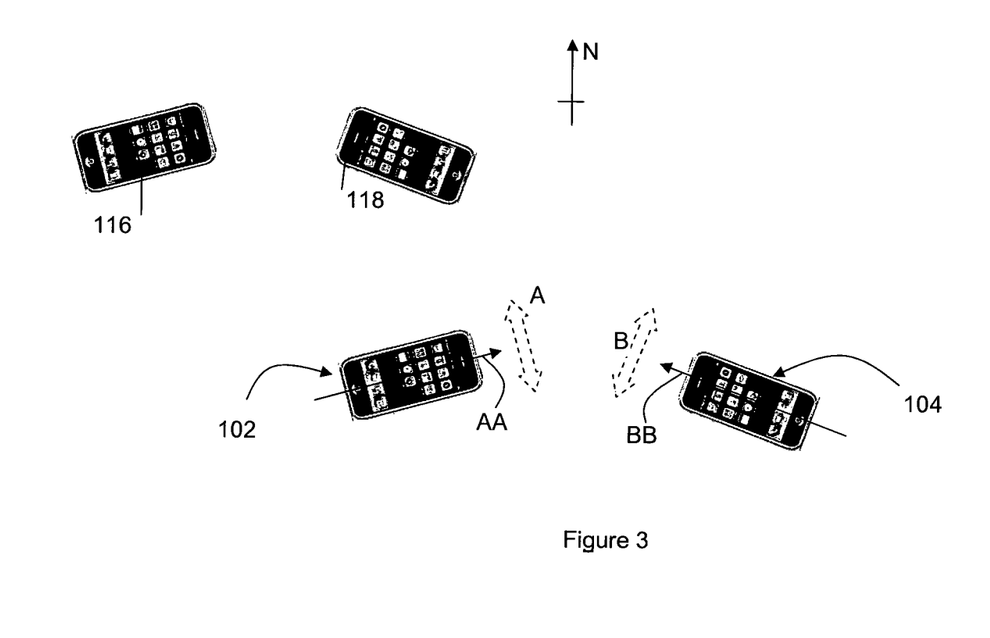
FIG. 3 shows shaking directions of the two mobile phone of FIG. 1 and two other mobile phones.
Figure 4:
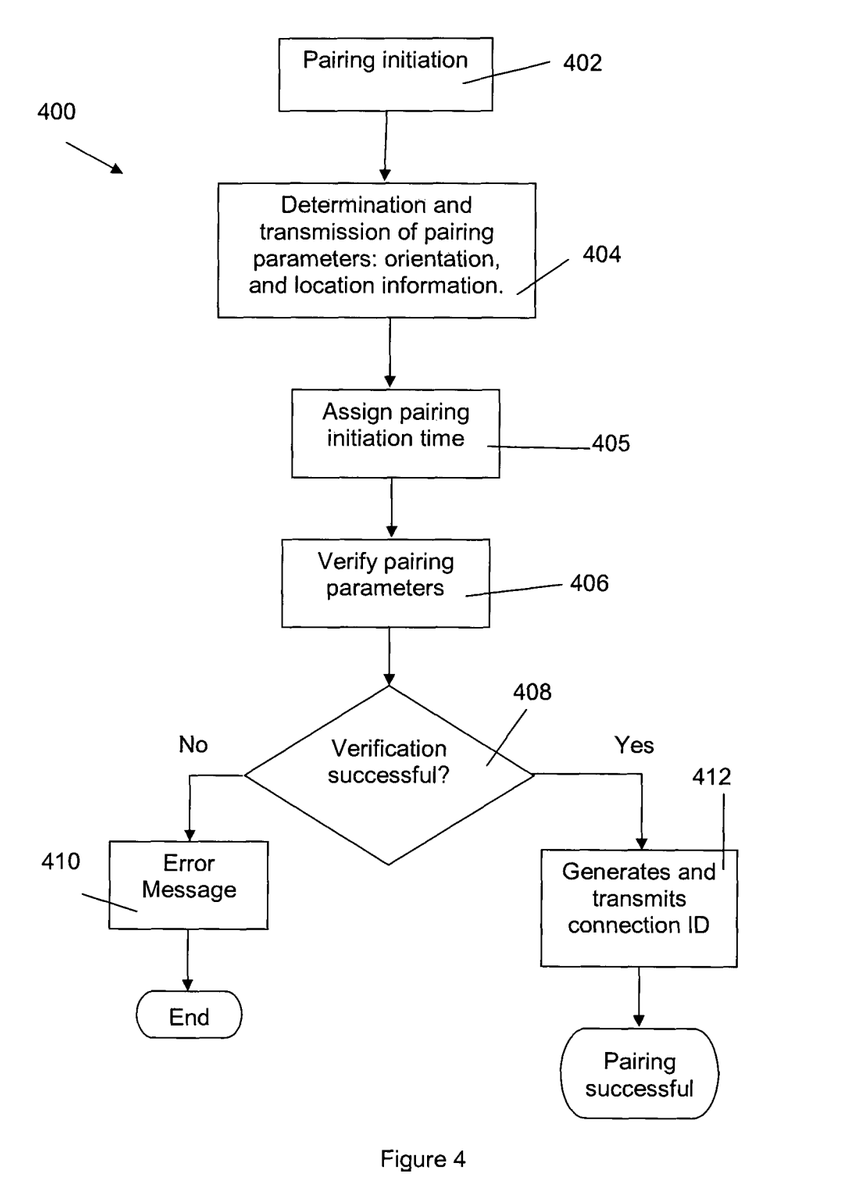
FIG. 4 is a flowchart defining a pairing algorithm performed by the apparatus of FIG. 1.

FIG. 4 shows a pairing algorithm 400. To initiate the pairing between the two mobile phones 102,104 at step 402, users of the mobile phones 102,104 hold the mobile phones 102,104 in their respective hands and make a "hand-shake" gesture. The hand-shaking gesture is illustrated as arrows A and B in FIG. 3. The hand shake motions A and B are detected by the respective accelerometers 202 in the mobile devices 102,104 and this initiates the pairing between the two mobile phones 102,104. The controllers 210 of the mobile phones 102,104 receive the respective pairing initiations and the controllers 210 next determine pairing parameters at step 404.

The controllers 210 interrogate the corresponding digital compasses 204 to obtain orientations AA,BB of the respective mobile phones 102,104 as a first pairing parameter. Using the example of FIG. 3, with North "N" indicated as shown, the orientation AA of the first mobile device 102 is 100° E with respect to the north. It should be appreciated that in this embodiment, the orientation is the direction where top of the phone is pointing. The top of the phone is where the earpiece is located as opposed to the receiver which is at the bottom of the phone. In the case of the second mobile phone 104, the orientation of the phone during the "handshake gesture" is direction BB which is 278° W.

It has been found that if the orientation of the mobile phones 102,104 are determined during the hand shake gesture (i.e. when the mobile phones 102,104 are being shaken), the reading may not be accurate. Thus, it is preferred for the orientation of the mobile phones 102,104 to be obtained just before the handshake gesture. To achieve this, the digital compass 204 continuously detects the orientation of the respective mobile phones 102,104 and updates values of the orientation in a memory in the respective mobile phones 102,104.

Thus, when the controllers 210 of the mobile phones 102,104 receive the respective pairing initiations, instead of capturing the orientations of the mobile phones 102,104 at that time, the controllers 210 looks up the memory in the respective mobile phones 102,104 just before the shake initiation and in this case, 1 second before.

For the purposes of this embodiment, the orientations of the mobile phones 102,104 just before the shake initiation are 100° E and 278° W respectively. In this embodiment, 20° error margin or tolerance is provided and this will be elaborated below. It should be understood that the error margin may be revised and changed according to applications.

The controllers 210 also initiate download of respective GPS signals from the AGPS modules 206 to the controllers 210 at step 404. As it would be appreciated, the AGPS modules 206 obtain the GPS signal from GPS satellites 108,110 via the respective base stations 112,114 since AGPS is used. This results in a much quicker receipt of the GPS signals. If the AGPS is weak or to enhance the accuracy, the mobile phones 102,104 may use Wi-Fi (if available) to determine their locations.

The GPS signals identify the geographical locations of the mobile phones 102,104 using latitude and longitude coordinates and these are used as a second pairing parameter. Let's assume that the geographic coordinates of the first mobile phone 102 is $(x_1,y_1)$ and the second mobile phone 104 is $(x_2,y_2)$ where $x_1$ and $x_2$ are the latitude coordinates of the first and second mobile phones 102,104 respectively and $y_1$ and $y_2$ are the longitude coordinates of the first and second mobile phones 102,104 respectively.

The controllers 210 of the mobile phones 102,104 next transmit pairing requests including the respective pairing parameters including the shake directions, and geographical locations to the shake server 106 via the antennas 212.

On receipt of the pairing requests, at step 405, the shake server 106 assigns a pairing initiation time to each pairing request at step 405 and the pairing initiation times are the third pairing parameter. In this case, let's assume the pairing initiation time is $t_1$ for the first mobile phone 102 and $t_2$ for the second mobile phone 104.

At steps 406 and 408, the shake server 106 verifies the pairing parameters by comparing the pairing parameters with pairing conditions. The shake server 106 checks the geographical locations $(x_1,y_1)$ and $(x_2,y_2)$ of the two mobile phones 102,104 to determine if they are within the same location. In this embodiment, the same location is defined as within a distance threshold of 300 meters of each other, and the distance threshold is thus one of the pairing conditions. If the mobile phones 102,104 are not within the same location, the pairing algorithm 400 proceeds to step 410 to generate a pairing error message which ends the pairing algorithm. For the users to reinitiate the pairing, they have to shake the mobile devices 102,104 again.

If the shake server 106 verifies that the two mobile phones 102,104 are within the same location (i.e. within 300 meters), the shake server 106 verifies the pairing initiation times $t_1,t_2$ which helps to determine if both the mobile phones 102,104 are indeed the pairs which initiated the handshake gesture. In this embodiment, a difference between the initiation times $t_1,t_2$ is used and based on a time threshold of 50 seconds, which is another pairing condition. To elaborate, if the difference is <50 seconds, then the shake server 106 would regard that the mobile phones 102,104 wish to be paired. On the other hand, if the difference is 50 seconds or more, the error message is displayed at step 408.

If the difference between the initiation times $t_1,t_2$ is <50 seconds, the shake server 106 next checks if the first pairing parameter, the shake direction, is to be used. If shake server 106 did not receive pairing requests from other mobile phones (except the first and second mobile phones 102,104), then the shake server 106 need not use the orientation as part of the pairing algorithm.

On the other hand, if the shake server 106 has received pairing requests from the two mobile phones 102,104 and other mobile phones (for example, third and fourth mobile phones 116,118, see FIG. 3) and these mobile phones 102, 104,116,118 all satisfy the distance and time thresholds discussed earlier, the shake server 106 would use the orientation to determine which of the two mobile phones wish to be paired. This is advantages since it would increase the pairing success rate—instead of abandoning the pairing in view of so many mobile devices, the shake server 106 is able to make use of the orientation to recognize correct pairs of the mobile devices for the pairing.

Taking the orientation AA of 100° E and the orientation BB of the second mobile phone of 278° W, the shake server 106 processes these two orientations to determine if the two mobile devices 102,104 are pointing at each other.

Firstly, the shake server 106 takes the orientation of the first mobile phone 102 of 100° E and inverses this value to arrive at 280°. Next, the shake server 106 derives minimum and maximum orientation values using the error margin of 20°. The minimum orientation value is 280°-10° to give 270° and the maximum orientation value is then 280°+10° to give 290°.

Secondly, the shake server 106 compares the orientation of the second mobile phone 104 with the minimum and maximum orientation values. If the orientation of the second mobile phone 104 falls within the minimum and maximum orientation values, the shake server 106 would know that the two mobile phones 102,104 took part in the same "handshake".

In this example, the orientation of the second mobile phone 102,104 is 278° W which falls within the minimum and maximum orientation values of 270° and 290°. Thus, this pairing condition is satisfied, and the flow goes to step 412.

Once the shake server 106 verifies and recognizes the two pairing mobile phones 102,104, the shake server 106 generates a connection identifier (ID) for this pair of mobile phones 102,104 at step 412, and transmits the connection ID to the pair of mobile phones 102,104. With the transmission of the connection ID, the pairing between the first and second mobile phones is considered successful and on receipt of the connection ID, the first and second mobile phones 102,104 are ready to transfer or share data.

In this embodiment, the first mobile phone 102 wishes to transfer data (which may include image, contacts, e-business cards, text notes, money value etc) to the second mobile phone 102 and sends the data together with the connection ID to the shake server 106. On receipt of the data and the connection ID, the shake server 106 stores them as a tag and waits for the second mobile phone 104 to establish a data transfer connection with shake server 106 (if the data transfer connection is yet to be established). The second mobile phone 104 periodically checks with the shake server 106 and when the data is available to be transmitted to the second mobile phone 104, the second mobile phone 104 sets up the data transfer connection with the shake server 106.

With the connection ID received, the second mobile phone 104 establishes the data transfer connection with the shake server 106 to receive the data from the shake server 106 based on the connection ID. The shake server 106 retrieves the tag based on the connection ID and sends the tag comprising the data from the first mobile phone 102 to the second mobile phone 104.

The second mobile phone 104 receives the transferred data to complete the data transfer and the shake server closes the connection ID.

As it can be appreciated, the data transfer between the two mobile devices 102,104 uses the shake server 106 as a bridge. With the pairing algorithm 400, the pairing success rate is enhanced.

It should be appreciated that the pairing algorithm 400 may be used with any mobile devices, not just mobile phones, and also using any operating systems such as Apple IOS™, Andriod™, Blackberry™ OS, Windows Mobile™ 7/8, Symbian™ etc.

The pairing algorithm 400 may also be useful in many applications such as e-wallet (stored value reload, credit sharing, payment), mobile advertisement, banking, ticketing (e.g. airline) etc. This would enhance mobile application offerings and applications and makes exchange or transfer of data or information more convenient and quicker.

Figure 5:
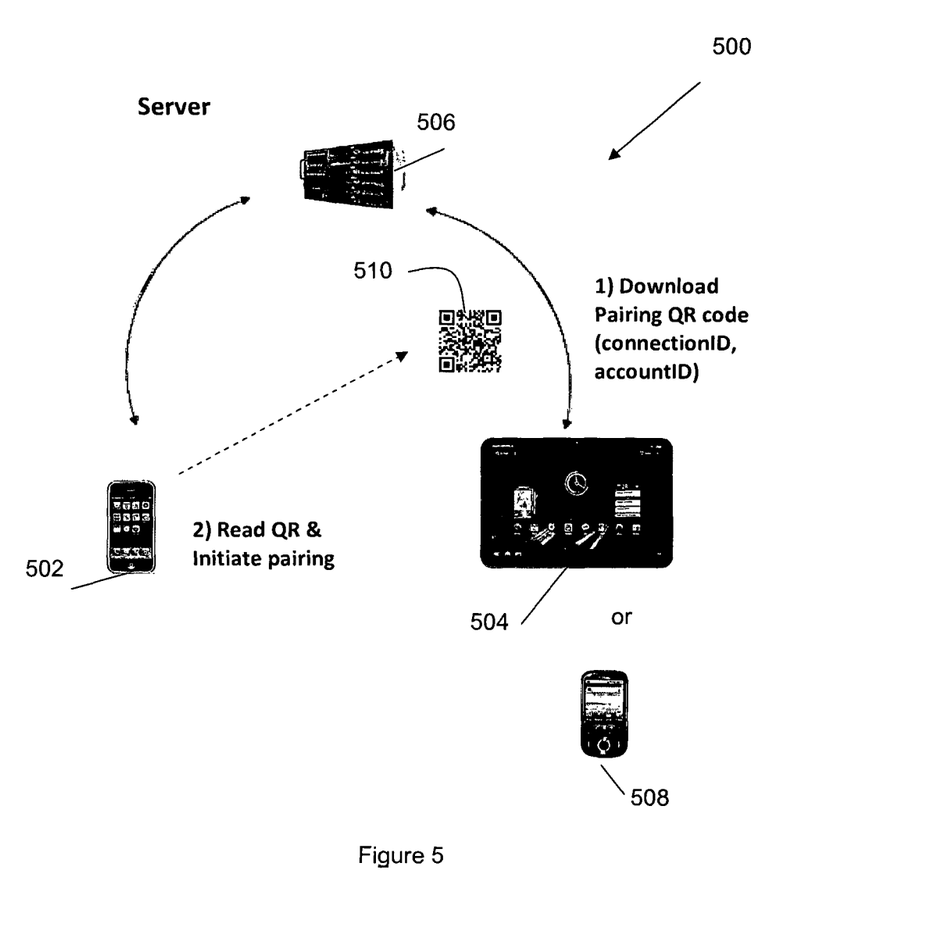
FIG. 5 is a schematic diagram of an apparatus for pairing two communication devices according to a second embodiment.
Figure 6:
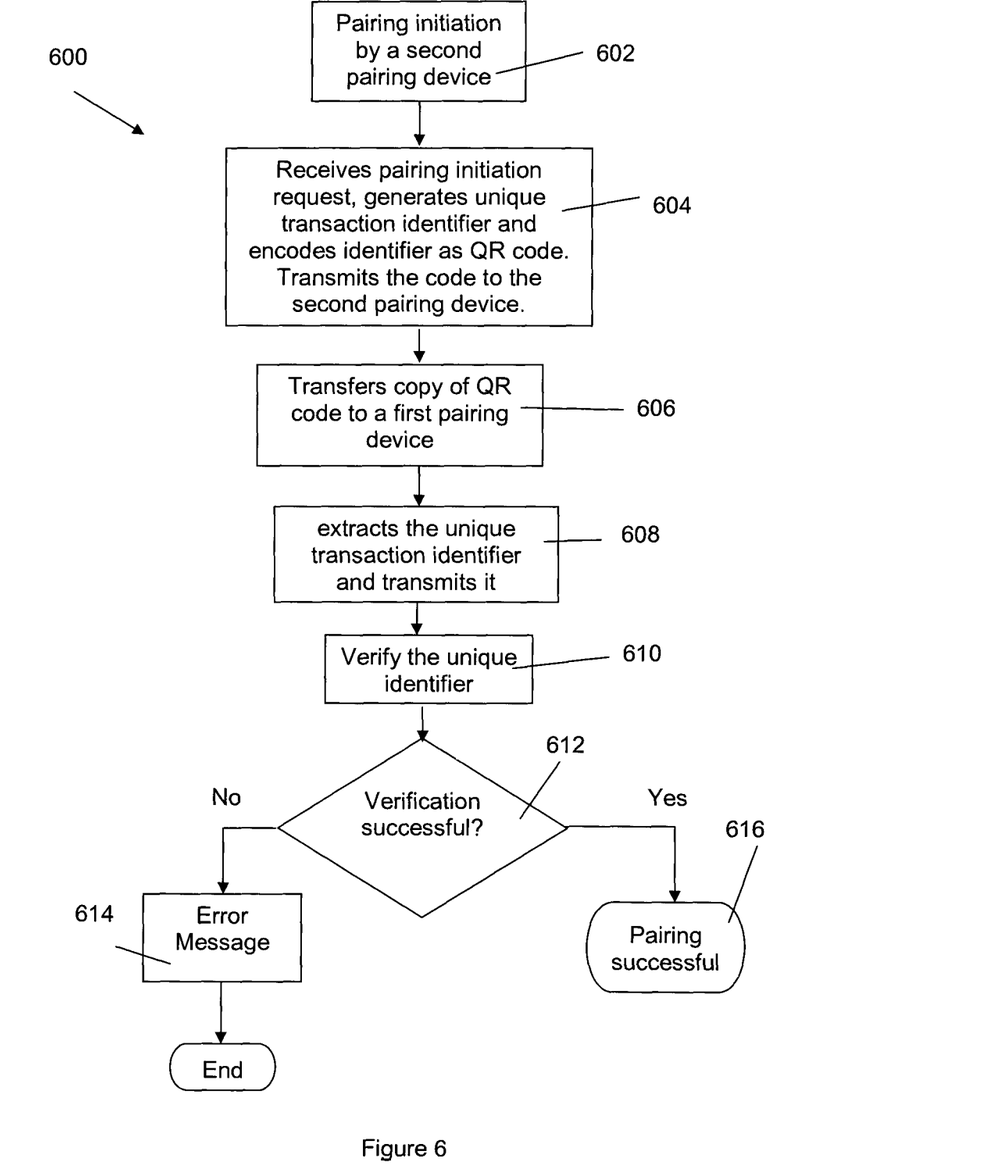
FIG. 6 is a flowchart defining a pairing algorithm performed by the apparatus of FIG. 5.

FIG. 5 shows an apparatus 500 for pairing first and second communication devices 502,504 according to a second embodiment, and FIG. 6 is a flow chart illustrating an overview of a pairing method performed by the apparatus 500. The apparatus 500 includes a mobile phone 502 and an electronic terminal 504 which may be a fixed terminal at a merchant store. The mobile phone 502 and the electronic terminal 504 are configured to communicate with a pairing server 506 via known means such as the telecommunication protocols discussed in the first embodiment. The pairing server 506 is operated by a third party, for example, bank, financial institution or other organizations.

In this embodiment, the pairing is performed to authenticate the two communication devices 502,504 with a user of the mobile phone 502 wishing to purchase an item from the merchant associated with the electronic terminal 504. At step 602, the merchant keys in transaction information (e.g. amount for the item, merchant identification etc) to the electronic terminal 504 and initiates a transaction request to the pairing server 506 to request a unique transaction identifier.

Upon receiving the transaction request, the pairing server 506 generates the unique transaction identifier at step 604 and in this embodiment, the pairing server 506 further encodes the unique transaction identifier and the transaction information as a pairing Quick Response™ (QR) code 510. The transaction information may include an Account ID for identifying the merchant (or generally requestor of the transaction request), monetary value of the transaction (for example, the purchase price of the item etc). The pairing server 506 next sends the pairing QR code 510 to the electronic terminal 504 of the merchant.

The merchant next displays the pairing QR code 510 on the electronic terminal 502 and the user of the mobile phone 502 launches an application in the mobile phone 502. The application prompts the user to 'login' with the user's details and these details are transmitted to the pairing server 506 for verification to establish an active session therebetween. With the active session established between the mobile phone 502 and the pairing server 506, the user uses the mobile phone 502 to capture an image of the pairing QR code 510 at step 606 by scanning or taking a photo of the pairing QR code 510.

From the captured QR code image, the mobile phone 502 extracts the unique transaction identifier at step 608 and displays the relevant information for verification by the user. In this embodiment, the displayed relevant information includes the item price, item description and merchant name etc. Next, the user is prompted to confirm the transaction by keying in a personal identification code (e.g. PIN) into the mobile device 502 to confirm the transaction and the user does so if the displayed relevant information is correct. The application running in the mobile phone 502 next transmits the PIN to the pairing server 506 for verification. The pairing server 506 verifies that the PIN received is indeed associated with the user (based on the earlier login details) and if the PIN is valid, the pairing server 506 signals to the mobile phone 502 accordingly.

It should be appreciated that instead of PIN, the user's biometric information may be used for the authentication (via a biometric device integral with the mobile phone 502 or a separate biometric device coupled to the mobile phone 502)

Next, the application in the mobile phone 502 transmits the unique transaction identifier and the relevant information (price of item, item description etc) as part of a pairing verification request to the pairing server 506 for verification.

At step 610, the pairing server 506 verifies validity of the extracted unique transaction identifier and if the extracted unique transaction identifier is the same as the unique transaction identifier which was generated and forwarded to the electronic terminal 504 by the pairing server 506, the verification is considered to be successful and the mobile phone 502 is considered to be paired with the mobile terminal 504 (and vice versa), at step 616. On the other hand, if the identifiers do not match, then the verification is unsuccessful and the pairing server 506 returns error messages to the mobile phone 502 and the electronic terminal 504 at step 614.

When the verification is successful, the pairing server 506 would process the transaction for example, by approving the transaction so that payment can be made to the merchant (by transferring the payment amount from the user's account, or invoicing the user accordingly). Status messages would then be sent to both parties. Processing the transaction may also involve the pairing server 506 re-directing or sending the transaction details to a third party for further processing before approving the transaction.

Instead of pairing between the mobile phone 502 and the fixed terminal 504, the pairing may be between the mobile phone 502 and another mobile device such as another mobile phone 508 (see FIG. 5). The flow is similar to the flow illustrated in FIG. 6 and assuming that the user of the first mobile phone 502 wants to make payment to the user of the second mobile phone 508 and in this case, the second mobile phone 508 is considered a recipient. After launching a software application in the mobile phones 502,508, the second mobile phone 508, being the recipient, sends a request to the pairing server 506 to request a unique transaction identifier. The pairing server 506 generates the unique transaction identifier, embeds it within a QR code, and transmits the QR code to the second mobile phone 508.

Next, the user of first mobile phone 502 keys in the amount to pay and authenticates the payment by keying in a valid security PIN. The user of the first mobile phone 502 next uses the mobile phone's camera to scan the QR code displayed on the second mobile phone 508. The software application of the first mobile phone 502 extracts the unique transaction identifier from the QR code, and sends this together with the payment amount and the user's (i.e. payer) account number to the pairing server 506.

The pairing server 506 next verifies the received unique transaction identifier by comparing it with the one sent to the second mobile phone 508 by the pairing server 506. If the received unique transaction identifier matches the earlier one, the pairing is considered successful, and the pairing server 506 processes the transaction and in this case, transferring of money from the payer's account (i.e. user of the mobile phone 502) to the user of the second mobile phone's 508 account. A status message is also sent to each of the users via their mobile phones 502,508.

If the verification fails, error messages are sent to the mobile phones 502,508.

As it can be appreciated, pairing of the mobile phones 502,508 (or between the mobile phone 502 and the terminal 504) using the unique transaction identifier helps the pairing server 506 to authenticate the transaction and to provide a secured exchange of information or data. Since the user who plans to transfer the funds to another user has access to the QR code which was generated and transmitted by the pairing server to the other user, this provides good evidence that the two communication devices (between the two mobile phones 502,508 or between the mobile phone 502 and the terminal 504) wants to be paired.

It should be appreciated that the second embodiment may be adapted for a variety of applications for example, loyalty programmes. Using the example of FIG. 5, and assuming that the user of the first mobile device 502 has reward points to exchange for an item with the merchant of the electronic terminal 504, the user requests and downloads a QR code embedded with a unique transaction identifier and information regarding the loyalty reward, for example, a free cup of coffee, into the first mobile phone 502. The user then brings the mobile phone 502 to the merchant and shows the QR code to the merchant which may be an operator of a coffee outlet. The merchant then invokes a software program (if the software program is not already running) in the electronic terminal 504 to capture an image of the QR code. Likewise, the unique transaction code is extracted from the captured QR code and the code is sent to the pairing server 506 for verification. If the verification of the unique transaction code is successful, this means that the QR code is genuine, and the pairing server 506 would send a confirmation message to the electronic terminal 504.

With the pairing successful, the merchant is assured of the authenticity of the QR code and may proceed to provide a free cup of coffee to the user (i.e. the transaction), in accordance with the conditions of the loyalty reward.

The described embodiments should not be construed as limitative. For example, instead of a mobile phone, other mobile/communication devices, such as tablets and PDA's etc may also use the proposed method for transferring data. Also, in the first embodiment, AGPS is used for determining the geographical location of the mobile phones 102,104 but it is envisaged that the mobile phones may communicate directly with the GPS satellites 108,110 to receive the GPS signals, although this may not be preferred. It is also envisaged that the location of the mobile phones 102,104 may be determined from other ways, for example, Wi-Fi positioning systems. The first embodiment uses the transfer of data from the first mobile phone 102 and the second mobile phone 104 as an example, but it should be appreciated that the pairing algorithm 400 may also be used for exchange of data between the two mobile phones 102,104. Further, the apparatus 100 may pair devices simultaneously or sequentially using the pairing algorithm 400 depending on the configuration of the shake server 106 and the other components. Also, instead of pairing between one mobile phone to another mobile phone, the pairing algorithm may be used to pair one mobile phone (or device) to many mobile phones (or devices). Likewise for the second embodiment, the pairing may be between one device and multiple devices.

Needless to say, it would be appreciated that the distance and time thresholds, and the error margin of the orientation of the first embodiment may vary accordingly.

Also, in the first embodiment, the orientation of the mobile phones 102,104 may or may not be used depending on the verification of the other two pairing parameters: location information and pairing initiation time. However, it is envisaged that the orientation of the mobile phones 102,104 may be used by default, to enhance the accuracy of the pairing.

In the second embodiment, the input of PIN may not be necessary as evidenced by the above explanation, although using PINs add another layer of security. Instead of QR code, other coding techniques may be used, such as a barcode. It may also be possible to send the unique transaction identifier in the clear together with other information, although this may not be preferred.

Having now fully described the invention, it should be apparent to one of ordinary skill in the art that many modifications can be made hereto without departing from the scope as claimed.

Having described the invention, the following is claimed:

1. A method of pairing mobile devices for transferring data between paired mobile devices, the method comprising,
  (i) verifying pairing parameters with pairing conditions to determine the mobile devices for pairing, at least one of the pairing parameters being received from the mobile devices to be paired, the pairing being initiated by shaking movements of the mobile devices, which are not in contact with each other, and the at least one pairing parameter includes respective orientations of the mobile devices, the respective orientations corresponding to a vector that extends from a receiver of the mobile device to an ear piece of the mobile device, and determining that the respective orientations of the mobile devices are pointing at each other within a predetermined error margin, wherein the orientations of the mobile devices are obtained at a predetermined time before initiation of the shaking movements; and
  (ii) if the pairing conditions are satisfied, pairing the mobile devices.

2. The method according to claim 1, wherein at least one of the parameters is provided by a pairing server for pairing the mobile devices.

3. The method according to claim 1, further comprising determining if the orientations of the mobile devices are to be used in the verification step (i); and if so, verifying the orientations of the mobile devices.

4. The method according to claim 1, further comprising continuously recording the orientation of the mobile devices.

5. The method according to claim 1, wherein the pairing parameters include geographical locations of the mobile devices and/or pairing initiation times at which requests for pairing are received.

6. The method according to claim 5, wherein the pairing conditions include a distance threshold, and step (i) includes determining distance between the two mobile devices based on the geographical locations of the mobiles devices; and comparing the distance with the distance threshold.

7. The method according to claim 5, wherein the pairing conditions include a time threshold, and step (i) includes determining difference between the initiation times of the two mobile devices; and comparing the difference with the time threshold.

8. The method according to claim 1, wherein step (ii) includes generating a connection identifier for identifying the mobile devices for pairing; and transmitting the connection identifier to the two mobile devices; wherein the connection identifier is transmitted together with the data to be transferred.

9. The method according to claim 1, wherein step (ii) includes pairing said mobile device with a plurality of other mobile devices.

10. A method of pairing mobile devices for transferring data between paired mobile devices, the method comprising,
  (i) continuously recording orientations of the mobile devices:
  (ii) verifying pairing parameters with pairing conditions to determine the mobile devices for pairing, at least one of the pairing parameters being received from the mobile devices to be paired, the pairing being initiated by shaking movements of the mobile devices, which are not in contact with each other, and the at least one pairing parameter includes respective orientations of the mobile devices and determining that the mobile devices are pointing at each other based on the respective orientations wherein the orientations of the mobile devices are obtained at a predetermined time before initiation of the shaking movements; and
  (iii) if the pairing conditions are satisfied, pairing the mobile devices.

11. The method according to claim 10, wherein the predetermined time is 1 second.

12. A method of pairing mobile devices for transferring data between paired mobile devices, the method comprising,
  (i) verifying pairing parameters with pairing conditions to determine the mobile devices for pairing, at least one of the pairing parameters being received from the mobile devices to be paired, the pairing being initiated by shaking movements of the mobile devices, which are not in contact with each other, and the at least one pairing parameter includes respective orientations of the mobile devices and determining that the mobile devices are pointing at each other based on the respective orientations wherein verifying the pairing parameters with the pairing conditions include inversing the orientation of one of the mobile devices to obtain an inversed orientation, and comparing the inversed orientation with the orientation of the other one or more mobile devices; and (ii) if the pairing conditions are satisfied, pairing the mobile devices.

13. The method according to claim 12, further comprising deriving maximum and minimum values of the inversed orientation based on an error margin, and comparing the maximum and minimum value with the orientation of the other one or more mobile devices.

14. Apparatus for pairing mobile devices for transferring data between paired mobile devices, the apparatus comprising a controller for verifying pairing parameters with pairing conditions to determine the mobile devices for pairing, at least one of the pairing parameters being received from the mobiles devices to be paired, the pairing being initiated by shaking movement of the mobile devices, which are not in contact with each other, and the pairing parameters including respective orientations of the mobile devices, the respective orientations corresponding to a vector that extends from a receiver of the mobile device to an ear piece of the mobile device, and determining that the respective orientations of the mobile devices are pointing at each other within a predetermined error margin, wherein the orientations of the mobile devices are obtained at a predetermined time before initiation of the shaking movements and wherein the controller is further configured for pairing the mobile devices based on the verified pairing parameters.

15. A method of pairing mobile devices for transferring data between paired mobile devices, the method comprising (i) shaking a mobile device to initiate a pairing request with another mobile device, the mobile device not in contact with the other mobile device;

(ii) in response to the shaking, transmitting at least one pairing parameter to a pairing server for verification against pairing conditions, the at least one pairing parameter including orientation of the mobile device, the orientation corresponding to a vector that extends from a receiver of the mobile device to an ear piece of the mobile device, to determine that the orientation of the mobile device being shaken is pointing toward an orientation of another mobile device to be paired within a predetermined error margin, wherein the orientation of the mobile device is obtained at a predetermined time before initiation of the shaking movements; and (iii) receiving a connection identifier from the pairing server, the connection identifier being used in the data transfer.

16. A method of pairing mobile devices for transferring data between paired mobile devices, the method comprising (i) shaking the mobile devices to initiate pairing requests, the mobile devices not in contact with each other;

(ii) verifying pairing parameters with pairing conditions by a pairing server to determine the mobile devices for pairing, at least one of the pairing parameters being received from the mobile devices to be paired, the at least one pairing parameter including respective orientations of the mobile devices, the respective orientations corresponding to a vector that extends from a receiver of the mobile device to an ear piece of the mobile device, to determine that the respective orientations of the mobile devices are pointing at each other within a predetermined error margin wherein the orientations of the mobile devices are obtained at a predetermined time before initiation of the shaking movements;

(iii) if the pairing conditions are satisfied, generating a connection identifier for identifying the mobile devices for pairing; and (iv) transmitting the connection identifiers to the mobile devices.

* * * * *